Patented May 9, 1933

1,907,438

UNITED STATES PATENT OFFICE

BEVERLY OBER AND EDWARD H. WIGHT, OF BALTIMORE, MARYLAND, ASSIGNORS, BY MESNE ASSIGNMENTS, TO THE OBERPHOS COMPANY, OF BALTIMORE, MARYLAND, A CORPORATION OF MARYLAND

AMMONIATION OF ACID PHOSPHATE

No Drawing.   Application filed August 20, 1929. Serial No. 387,258.

This invention relates to an improved process of treating phosphatic material for the production of phosphatic fertilizers and is a continuation in part of prior application Serial No. 185,066, filed April 19, 1927, now Patent 1,869,272.

In the usual methods acid phosphate and double superphosphates are prepared by reacting sulphuric acid or phosphoric acid with ground phosphate rock. When superphosphate is to be prepared the rock is ground and mixed with a predetermined amount of acid in an open mixing pan. After a very short agitation period the charges from the pan are dumped, one upon another, into a large den. In this so-called den process the reactions which begin in the mixing pan continue in the den, and even later, to form final end products, among which are the agriculturally available phosphatic salts. In the ordinary method the material is removed from the den and transferred to a curing shed. This curing period is for the purpose of permitting a more complete drying and lowering of the free acid.

In these processes the mixing period is of short duration and necessarily incomplete. The reaction of sulphuric acid on the tricalcium phosphate and impurities is very vigorous. As a result solid end products are formed and the initial liquid mass very soon solidifies or "sets up". This solidification or partial solidification of the reactive mass prevents further agitation and therefore precludes protracted mechanical mixing.

In these older processes it was recognized as advantageous to dust or treat the fertilizer product with an acid absorbent such as ground phosphate rock or lime and to mix this with the reaction products. The purpose of such a step is to absorb or utilize the free acid which may be contained in the material. Such methods, involving as they do rehandling of the material and extensive curing periods, are uneconomical both from the standpoint of plant cost and labor expenditures.

It is an object of the present invention to devise a process for manufacturing phosphate fertilizer by which any free acid may be reduced and substantially eliminated, and concomitantly with this elimination of acid to increase the availability of the product and add additional fertilizer values.

Another object is to provide a process for manufacturing phosphate fertilizer in which the several steps of the process, down to its preparation in a form fit for grinding, is carried out in a minimum of apparatus.

Yet another object is to provide a process by which a substantially acid free phosphatic fertilizer containing other valuable fertilizer ingredients may be produced without involving an extended curing period.

A further object is to provide a novel process by which the free acid contained in fertilizers may be eliminated or neutralized while incorporating additional fertilizer values.

A still further object is to provide a special treatment for a prepared acid phosphate or double superphosphate by which the free acid may be eliminated and additional fertilizer values homogeneously distributed through the mass.

With these and other equally important objects in view the invention includes a special method of treatment of phosphatic raw materials to produce available phosphates which incorporates a special treatment of certain reaction products so as to not only substantially eliminate free acid but also to increase the availability of fertilizing reaction products and to homogeneously incorporate additional fertilizer values.

In its major features the present invention is quite similar to that described in the copending application above referred to but which involves a special treatment which is accompanied by decided advantages.

In carrying out the process, predetermined quantities of phosphatic raw material, of a suitable degree of fineness, and a strong mineral acid such as sulphuric acid, are admitted to an autoclave. In this element the temperatures and pressures may be so regulated as to retain the mass in a mixable or fluid condition for a determinative period of time, as described in application Serial No. 179,706, filed March 30, 1927, now Patent 1,837,331.

If desired, and as described in application Serial No. 304,789, filed September 8, 1928, the reactive materials may be charged to the autoclave in separate streams or may be admixed in a compounding stage and the resultant confluent stream admitted to the autoclave. As described in that application, the charging may be carried out either under positively applied pressure on the raw materials or a reduced pressure on the autoclave, or by one of these methods supplemented by the other.

While not limiting ourselves to any statement as to the physical or chemical conditions or reactions occurring in the process, it appears that the retention of pressures in the container tends to maintain substantially the initial concentration of the original elements or components of the mass and maintains sufficient water in a potentially available form for the subsequent crystallization of certain of the products.

When the reactive ingredients are charged in the manner described in application Serial No. 304,789, an intimate and substantially quantative mixture of the acid and rock dust may be obtained. However, if desired, and as noted above, the materials may be admitted to the autoclave and mixed therein while retaining high pressures. In this instance the autoclave itself, in effect, is used as the mixing element. By retaining pressures in the container and/or cooling the materials, the reactivity of the products tends to be retarded and the mass is retained in a mixible condition for a long period of time. By agitating the material while in this substantially fluent and mixible condition a very homogeneous dispersion of the reactive components may be obtained. This, as will be appreciated, results in greater uniformity of product and higher economy of acid.

While certain methods of mixing and of admitting either mixed or unmixed materials to the autoclave are here described as the preferable methods, it is to be clearly understood that the present improvements are by no means limited to the use of these specific preliminary steps. As will be noted hereinafter, certain of the methods of treatment embodied in the present process may be utilized to improve a fertilizer product which has already been made up by other methods.

After the materials have been thoroughly admixed in the manner described, or in any other manner, the physical conditions within the autoclave are then regulated or adjusted so as to permit accelerated chemical reactivity and to complete the reactions which eventuate in the desired end products. More specifically, this regulation or adjustment comprises elevating the temperature of the material within the container by any suitable means. This increase in temperature accelerates the reaction and permits the conversion of the insoluble phosphates to the soluble form. The reaction may be further speeded up by diminishing the pressure slightly. If desired, both the temperature and pressure conditions may be adjusted so as to insure a speedy reaction.

It will be understood at this point that the pressures utilized in the system may be autogenous or may be generated from some extraneous source. In the treatment of the ordinary type of raw material, namely tricalcium phosphates, the character of the impurities in the rock are such as will generate a sufficient amount of vapors and of gases to supply the desired pressures. However, it to be clearly understood that if desired the material may be placed under the pressure of an inert gas admitted from an extraneous source. Also steam may be forced into the autoclave to maintain the pressure. This method of creating a pressure is of particular advantage, since it affords an artificial vapor tension and thus assists in the maintenance of the water in the reaction mass. After the materials have been mixed, either by the process described in application 304,789 or in application 179,706, the conditions are adjusted to insure the complete reaction of the reactive components. During the reaction stage the acid continues to react on the unattacked rock to convert the tricalcium phosphate into mono or dicalcium phosphate.

After the material has been permitted to digest for a requisite period of time, the conditions in the container are then adjusted to permit the crystallization of the product. As pointed out in the copending application, this may be done by releasing the pressure within the container. Upon release of pressure there is a sudden drop in the internal temperature due to the exit of gases and moisture vapor. This diminution in temperature tends to aid in crystallization of the crystallizable components of the product. The final product, as is known, contains crystalline salts such as mono and dicalcium phosphate, which take on water of crystallization. Due to the conditions under which the reaction was carried out, namely in a closed container in which components were maintained, the reactive zone contains sufficient water to completely crystallize the mass.

The product obtained from this treatment contains water soluble and citrate soluble phosphates and certain unavailables such as calcium sulphate. In addition to this, and particularly if the digestion has been incomplete or the mixing has not been carried out under optimum conditions, as for example in employing the old processes of mixing, the material may contain some quantity of free acid. The presence of free acid has disadvantages. The acid renders the material damp and gummy and its presence in the older processes necessitated such expedients as dusting with raw phosphate rock and subjecting it to curing, aeration or remilling. As a general rule it was necessary to first dust the product under careful conditions because the presence of the liquid acid prevented any great handling of the material due to its tendency to gum or become muddy. Furthermore the strong acid tends to rot the bag or other container in which the material is packed.

Now according to the present invention, any free acid in the material is neutralized by an expeditious method which serves in addition to impart other valuable properties to the material. Briefly considered this method consists in adding a predetermined quantity of ammonia so as not only to kill any free acid, but also to form compounds having fertilizer value. It is to be understood that the reduction of free acid and the addition of fertilizer values, and the increase in the availability of the product, all of which functions are subserved by the method about to be described, applies equally whether the method is employed on a product prepared by autoclaving as described herein or on a product produced by the usual den process. It is to be understood, therefore, that while the step is described as being particularly advantageous when used in conjunction with the prior autoclaving, it is nevertheless available for treatment of any fertilizer product which may contain acid constituents which are to be neutralized, or the fertilizer value of which is to be increased.

According to the present method, after the digesting period has been completed the vacuum pump is operated so as to pass the material under a vacuum. When the desired vacuum has been obtained a neutralizing substance which will kill the free acid and/or react with certain of the compounds in the product to produce other components having fertilizer values is added. A very desirable material for this use is ammonia. This may be added in any suitable manner and in any physical condition. For example it may be added as ammonia gas, anhydrous ammonia or aqueous ammonia.

Assuming that aqueous ammonia is to be used, the autoclave is connected to the ammonia tank. When the material in the autoclave has been placed under a vacuum the valve connecting the ammonia tank and the autoclave is opened. The then existing pressure differential causes a strong influx of ammonia into the autoclave. Now during the admission of the ammonia and in fact during the entire ammonification process, the autoclave is rotated and subjected to a cooling action such as contemplated in the process set forth in copending application 166,808, filed February 8, 1927, now Patent 1,837,307. The reasons for this are as follows: When ammonia is mixed with an acid phosphate product, certain exothermic actions follow and a considerable amount of heat is generated. This rise in temperature presents certain disadvantages. In the first place it tends to vaporize the water in the mass and render the latter unavailable for the crystallization of the products. Furthermore it appears that by maintaining the superphosphate in a cool condition, increasing amounts of ammonia may be absorbed, with decreasing reversion in availability of the superphosphate. In any event we find that it is highly desirable to maintain the material in a relatively cool condition and at least to the extent of largely abstracting the exothermic heats of reaction. Our invention therefore comprehends any and all means and methods by which the temperature of the mass may be controlled during the ammonification process.

A second and very important factor in ammonification is the control of the surface area. We have found that it is desirable to have the solid products charged and ammonified in as disperse or discrete a condition as possible. The reason for this appears to be two-fold. With a small subdivision of the phosphate there is an acceleration of the ammonification by reason of the fact that greater surface area is exposed to the action of the ammonia containing substance. Furthermore by maintaining the phosphatic material in a finely divided condition there is a greater distribution and homogeneity of the reaction products of ammonia and less danger of local contamination. In order to obtain the optimum surface exposure conditions we may reduce the material to finely divided form. This may be done either by rotating the autoclave itself so as to break up or tend to break up the phosphatic material, or by placing in the autoclave a means which will subserve a grinding function. If desired, also the material may be withdrawn from the autoclave in which it is first treated and subjected to a grinding action so as to increase the surface area after which it may be admitted to a second autoclave and, after a reduction of pressure, ammonia may be admitted into the zone of reduced pressure.

A peculiar advantage of utilizing a reduced pressure or vacuum on the material to which the ammonia is to be introduced is the fact that this reduced pressure tends to draw in the ammonia liquid as a gas. This of course tends to a wide distribution of the ammonia through the material which is to be treated. Furthermore we have found that this distribution is substantially continuous throughout the introduction of the ammonia.

This appears to be due to the avidity of the neutralent for the material within the container when the optimum reactive conditions are provided as explained.

The affinity of the ammonia for the phosphate material results in the chemical combination of the ammonia to produce ammonium sulphate salts, ammonium phosphate salts and other complex phosphates, or possibly ammonium fluoride compounds, and hence any tendency to the increase of pressure due to the admission of gas is eliminated.

Inasmuch as the increase in the surface area tends to a more homogeneous or holosteric product with a diminution in the time of reaction, we may employ other means to enhance this result. For example, not only may we grind the product to increase the surface exposure, but we may also mix the phosphatic material with spreading material, such for example as sawdust.

As noted above, whether the phosphatic material is ammonified in the container in which it is prepared or whether the phosphatic material which is ammonified is that prepared by the den method, we contemplate agitating the mass during ammonification. This may readily be done in the present case by rotating the autoclave. This rotation serves, so to speak, to circulate the reactive components and to insure a more even distribution and/or concentration of the reaction materials. In this manner particles of the phosphatic material are consistently subjected to contact with the ammonia containing substance with the resulting increase in reaction speed and homogeneity of reaction products.

In employing the autoclave hereinbefore described the agitation of the mass may be carried on simultaneously with the cooling. The provision of an external cooled jacket enables the recirculation of the temperature of the mass so as to provide optimum reaction conditions for ammonia absorption and thereby prevent heterogeneity and reversion. Obviously, however, instead of using an autoclave with an external shell we may provide other cooling means. For example we may insert a cooling coil in the interior of the autoclave, or we may utilize the expansion of anhydrous ammonia, in a suitable apparatus, to utilize its well known refrigerating effect. This and other equivalent means of controlling the temperature during ammonification are contemplated herein.

After the ammonification process the material may immediately be removed. It will be noted that due to the provision of controlling the temperatures during the process the material may be removed in a relatively cool state. The material may then be put through a grinding machine if desired, although when the product has been put through a grinding machine prior to the ammonification, a second grinding after ammonification is never necessary. It will be noted that the product is in excellent physical condition for grinding, packing and use. Due to the conditions under which the ammonification is carried out, the material comprises phosphatic and nitrogenous compounds having fertilizer values which are intermittently and homogeneously dispersed through the mass. Due to the control of the temperature during ammonification and to the equivalent amount of ammonia added, the material contains substantially no free acid and a minimal amount of water.

As noted hereinbefore the improvements described herein are applicable not only to a material produced by a novel method of autoclaving but also to any phosphatic fertilizer product, as for example a product prepared according to the usual den method. In operating on a den product the material may first be ground, admitted to an autoclave, the pressure reduced therein and the ammonia introduced into the zone of reduced pressure. In this case, it will be appreciated, the reduced pressure zone within the autoclave serves as the suction means for drawing in the ammonia and furthermore insures uniform contact of the reaction materials.

In operating with an autoclave process the ammonification may be carried out either in the autoclave in which the digestion is done or in a separate autoclave. The separate autoclave presents some advantages. The element itself, when used only for ammonification, need not be as expensive because it is not subjected to the rigorous high pressure conditions of the digestor. Furthermore by using a separate autoclave for the ammonification step it is possible to obtain operating economies, as for example by using a single ammonification autoclave for a plurality of digestors. In any and all of these cases it will be noted that the salient features of the invention include the introduction of ammonia to and in contact with the fertilizer product, which latter is maintained under a reduced pressure, the reaction of absorption of the neutralent such as ammonia under conditions of optimum surface area is obtained for example by fine grinding or by the use of spreading materials, or by the use of agitation or any combination of these steps. Of course, in each of the several methods of ammoniating the fertilizer, suitable methods and means for absorbing the heat generated may be employed to secure products having the desired properties.

It will be appreciated that we have provided a process for the treatment of materials whereby these materials may easily and expeditiously be treated to produce an improved product.

The term acid phosphate employed in the foregoing description and appearing in the appended claims is intended to include both superphosphate and double superphosphate fertilizers.

While we have described preferred embodiments of the invention, it is to be understood that these are given as typical and are to be considered as exemplifying the principles of the invention and not as restricting them to any stated number and sequence of steps or choice of particular materials.

We claim:

1. The process of producing acid phosphate fertilizers comprising converting insoluble phosphatic material to available forms, grinding the product, contacting the product with ammonia under subatmospheric pressure and subjecting the product to cooling while ammoniating.

2. The process of producing acid phosphate fertilizers comprising converting insoluble phosphatic material to available forms, admitting the product to an autoclave, reducing the pressure therein, admitting ammonia-containing fluid to the zone of reduced pressure and cooling the material in an autoclave.

3. The process of producing acid phosphate fertilizers comprising converting insoluble phosphatic material to available forms, comminuting the product, reducing the pressure therein, then adding ammonia while subjecting the mass to agitation and cooling.

4. The process of improving acid phosphate fertilizers comprising reducing the size of material having available phosphates, reducing the pressure on the material below atmospheric, admitting ammonia to the material and maintaining the temperature below a point which tends to detrimentally affect the product.

5. The process of producing ammoniated acid phosphate fertilizers comprising reacting finely divided phosphatic material with an acid in a confined space, removing the product from the space and admitting it to another space, reducing the pressure within said last named space and admitting ammonia to said reduced pressure space to react with the products therein.

6. The process of improving fertilizers having available acid phosphate fertilizer salts comprising comminuting the material, admitting it to a confined space, reducing the pressure within the space, adding ammonia while submitting the material to a cooling action.

7. The process of preparing acid phosphate fertilizers having potentially available fertilizer constituents comprising reducing the material to a state of fine subdivision, subjecting the material at elevated temperatures and in a confined space to the action of an acid, reducing the pressure on the material below atmospheric, admitting thereto material having combinable ammonia and cooling the mass during the addition of the ammonia.

8. A process of producing improved acid phosphate fertilizers comprising comminuting available phosphatic material, mixing the material with a spreading substance, introducing the mixture into a rotary autoclave, reducing the pressure on the material in the autoclave, introducing ammonia therein while continuing the rotation of the autoclave, and cooling the contents in the autoclave while adding ammonia thereto.

In testimony whereof we affix our signatures.

BEVERLY OBER.
EDWARD H. WIGHT.